US012394940B2

(12) United States Patent
Brown

(10) Patent No.: US 12,394,940 B2
(45) Date of Patent: Aug. 19, 2025

(54) FAN QUICK RELEASE

(71) Applicant: John T. Brown, Fort Walton Beach, FL (US)

(72) Inventor: John T. Brown, Fort Walton Beach, FL (US)

( * ) Notice: Subject to any disclaimer, the term of this patent is extended or adjusted under 35 U.S.C. 154(b) by 459 days.

(21) Appl. No.: 17/951,697

(22) Filed: Sep. 23, 2022

(65) Prior Publication Data

US 2023/0147813 A1 May 11, 2023

Related U.S. Application Data

(60) Provisional application No. 63/277,559, filed on Nov. 9, 2021.

(51) Int. Cl.

| | |
|---|---|
| ***H01R 13/73*** | (2006.01) |
| ***F04D 29/60*** | (2006.01) |
| ***H01R 13/516*** | (2006.01) |
| ***H01R 13/639*** | (2006.01) |

(52) U.S. Cl.

CPC ......... *H01R 13/639* (2013.01); *F04D 29/601* (2013.01); *H01R 13/516* (2013.01)

(58) Field of Classification Search

CPC ............................ H01R 13/639; H01R 13/516

See application file for complete search history.

(56) References Cited

U.S. PATENT DOCUMENTS

| | | | | |
|---|---|---|---|---|
| 4,042,291 | A * | 8/1977 | Moriyama | F21V 23/06 285/907 |
| 4,655,531 | A * | 4/1987 | Delaney | H01R 13/6392 439/531 |
| 4,721,480 | A * | 1/1988 | Yung | H01R 13/70 439/537 |
| 4,810,207 | A * | 3/1989 | Butterfield | H02G 3/20 439/529 |
| 4,871,327 | A * | 10/1989 | Ridgway | F16D 1/0894 403/379.3 |
| 5,067,906 | A * | 11/1991 | Woodgate | F21V 21/12 439/700 |
| 5,957,717 | A * | 9/1999 | Monsef | G01C 15/02 439/339 |
| 6,305,974 | B1 * | 10/2001 | Tseng | H01R 4/4821 439/537 |
| 7,143,988 | B2 * | 12/2006 | Blateri | F16B 39/04 248/343 |
| 7,785,077 | B2 * | 8/2010 | Richardson | F04D 25/088 417/423.15 |
| 2015/0200490 | A1 * | 7/2015 | Elia | F21S 8/085 439/682 |

* cited by examiner

*Primary Examiner* — Neil Abrams

(74) *Attorney, Agent, or Firm* — Dykema Gossett PLLC

(57) ABSTRACT

Various aspects of the present disclosure are directed to a fan quick release mechanism. In one example embodiment, the fan quick release may include: an upper coupling that attaches to a downrod hanging from a ceiling, a lower coupling that attaches to a fan/light/other electrical appliance, and a locking pin that couples the upper and lower couplings as desired. To further facilitate ease of assembly, electrical quick disconnects may be positioned within the respective upper and lower coupling assemblies—wherein coupling of the upper and lower couplings also results in the electrical quick disconnects electrically coupling as well.

9 Claims, 5 Drawing Sheets

FAN QUICK RELEASE

CROSS-REFERENCE TO RELATED APPLICATIONS

This application claims the benefit of U.S. provisional application No. 63/277,559, filed 9 Nov. 2021, which is hereby incorporated by reference as though fully set forth herein.

BACKGROUND a. Field

The instant disclosure relates to lighting, fans, and other electrical appliances. In one embodiment, the instant disclosure relates to outdoor hanging fans.

b. Background Art

When heavy winds are predicted from a storm or hurricane an outdoor fan hanging from a downrod may blow around and damage an outdoor ceiling fan's blades and ceiling fan motor housing (collectively "fan"), windows and/or the structure itself.

The ceiling on which a downrod and ceiling fan are hanging may be difficult to reach and disconnect the downrod and/or fan.

The foregoing discussion is intended only to illustrate the present field and should not be taken as a disavowal of claim scope.

BRIEF SUMMARY

Various aspects of the present disclosure are directed to a fan quick release mechanism. In one example embodiment, the fan quick release may include: an upper coupling that attaches to a downrod hanging from a ceiling, a lower coupling that attaches to a fan/light/other electrical appliance, and a locking pin that couples the upper and lower couplings as desired. To further facilitate ease of assembly, electrical quick disconnects may be positioned within the respective upper and lower coupling assemblies—wherein coupling of the upper and lower couplings also results in the electrical quick disconnects electrically coupling as well.

In one example embodiment, a quick release assembly is disclosed including an upper coupling, a lower coupling and a locking pin. The upper coupling is tubular and extends coaxially with a longitudinal axis of the assembly. The upper coupling includes a lower recess and a first aperture that extends through the lower recess in a direction transverse to the longitudinal axis. The lower coupling extends coaxially with the longitudinal axis. The lower coupling includes a first flange, a tubular body that extends beyond the first flange, and a second aperture extending through the tubular body of the lower coupling in a direction transverse to the longitudinal axis. The locking pin affixes the upper and lower couplings by extending through the first and the second apertures when the first and second apertures are aligned.

The foregoing and other aspects, features, details, utilities, and advantages of the present disclosure will be apparent from reading the following description and claims, and from reviewing the accompanying drawings.

BRIEF DESCRIPTION OF THE DRAWINGS

Various example embodiments may be more completely understood in consideration of the following detailed description in connection with the accompanying drawings, in which.

Figure 1A:
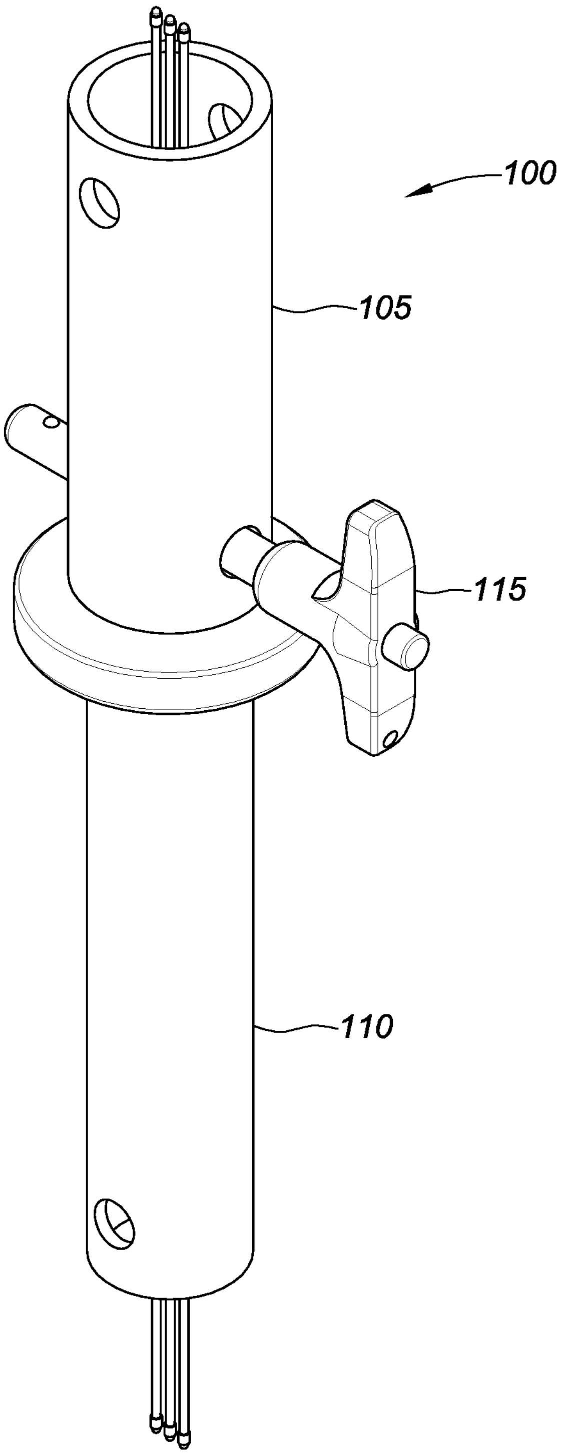
FIG. 1A is an isometric side view of quick release assembly, consistent with various embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation

DETAILED DESCRIPTION OF EMBODIMENTS

Various aspects of the present disclosure are directed to a fan quick release mechanism. In one example embodiment, the fan quick release may include: an upper coupling that attaches to a downrod hanging from a ceiling, a lower coupling that attaches to a fan/light/other electrical appliance, and a locking pin that couples the upper and lower couplings as desired. To further facilitate ease of assembly, electrical quick disconnects may be positioned within the respective upper and lower coupling assemblies—wherein coupling of the upper and lower couplings also results in the electrical quick disconnects electrically coupling as well.

When heavy winds are predicted from a storm or hurricane an outdoor fan hanging from a longer downrod may blow around and damage an outdoor ceiling fan's blades and ceiling fan motor housing (collectively "fan"), windows and/or the structure itself.

The ceiling on which a downrod and ceiling fan are hanging may be difficult to reach and disconnect the downrod and/or fan. Even if a junction box for the ceiling fan is readily accessible, uninstalling the downrod and/or fan can be quite difficult.

A home owner needs an easier way to remove a fan from a downrod in the event of a storm or hurricane or to take the fan in from the weather in a second home during the off season or simply to clean the fan blades or replace the fan itself An upper coupling, consistent with various embodiments of the present disclosure, may contain a top portion of a three (3) electrical wire connector ("top 3 wire connector") and which is electrically coupled to three (3) electrical wires (from a power source) that extend through the downrod. The top 3 wire connector extends through the Upper Coupling to the bottom of the Upper Coupling and is positioned to facilitate electrically coupling with a bottom 3 wire connector that is located in the Lower Coupling. Various other forms of connectors or electrical contacts may be used and alternatives will be readily appreciated by one of skill in the art. A receiver portion on the top of the Upper Coupling mimics a receiver portion on the top of a traditional ceiling fan for receiving and coupling to the downrod. In one example embodiment, the receiver portion may have a female thread to receive a male thread of the downrod. In another example embodiment, the receiver portion may have a through hole that aligns with a through hole on the downrod and may be fastened with a bolt/cotter pin/etc. through both of the through holes. The bottom portion of the Upper Coupling is designed with either an internal or external ring or flange, clamp, cotter pin, etc. so the Upper Coupling securely and releasably attaches to the Lower Coupling.

A lower coupling, consistent with various aspects of the present disclosure, may have a complimentary three (3) wire connector ("bottom 3 wire connector") to the top three wire connector. The bottom three wire connector is electrically coupled to the fan motor via electrical wires that are fed into and secured to the bottom 3 wire connector. The bottom 3 wire connector extends through the Lower Coupling to the top of the Lower Coupling so the bottom 3 wire connector is positioned to make electrical contact with the top three wire connector when the upper and lower couplings are coupled. As discussed above, other forms of connectors or electrical contacts may be used for both the upper and lower wire connectors. Moreover, more or less electrical contacts may be implemented where a given application so requires. For example, where lights on the fan may be independently controlled from the fan itself, additional contacts on the top and bottom wire connectors may be required.

In various embodiments of the present invention, the Lower Coupling may securely attach inside or outside the Upper Coupling. That is the lower coupling may be the male or female receiver with respect to the upper coupling. The Upper/Lower Coupling may have a spring loaded element so the two (2) Couplings may be securely attached to one another thereby mechanically and electrically coupling the fan to the downrod. When coupling the upper and lower coupling to one another, upon full insertion of one coupling into the other the spring loaded element will positively couple the two couplings to one another. In response to a user compression of the spring loaded element, the upper and lower coupling (in addition to the top/bottom wire connectors) may be released from one another. In some embodiments, releasing the spring loaded element may be accomplished by squeezing a handle which is attached to the top of the lower/upper Coupling. In some specific embodiments, the handle may also allow the operator to hold the weight of the fan so the operator can more easily descend the ladder (requiring only a single hand to release the coupling and support the disconnected fan).

A portion of the bottom of the Lower Coupling may be designed much like the bottom of a traditional downrod including a smooth inner bore that facilitates coupling to the top of the fan.

Both the upper and lower couplings may have lines or other guides on the inside and/or outside to help align the two Couplings so the three (3) wire connectors properly line up for an electrical connection.

In some specific embodiments, aspects of the present disclosure are further directed to securing the downrod. For example, a downrod with sufficient motion relative to a junction box may be swung upward toward the ceiling and coupled to a clip in a substantially horizontal fashion. The clip may be coupled to the ceiling at a distance from the junction box equal to approximately the length of the downrod. The clip may include a locking feature to positively capture the downrod within the clip.

Various example embodiments may be more completely understood in connection with the drawings, a discussion of which follows.

Figure 1B:
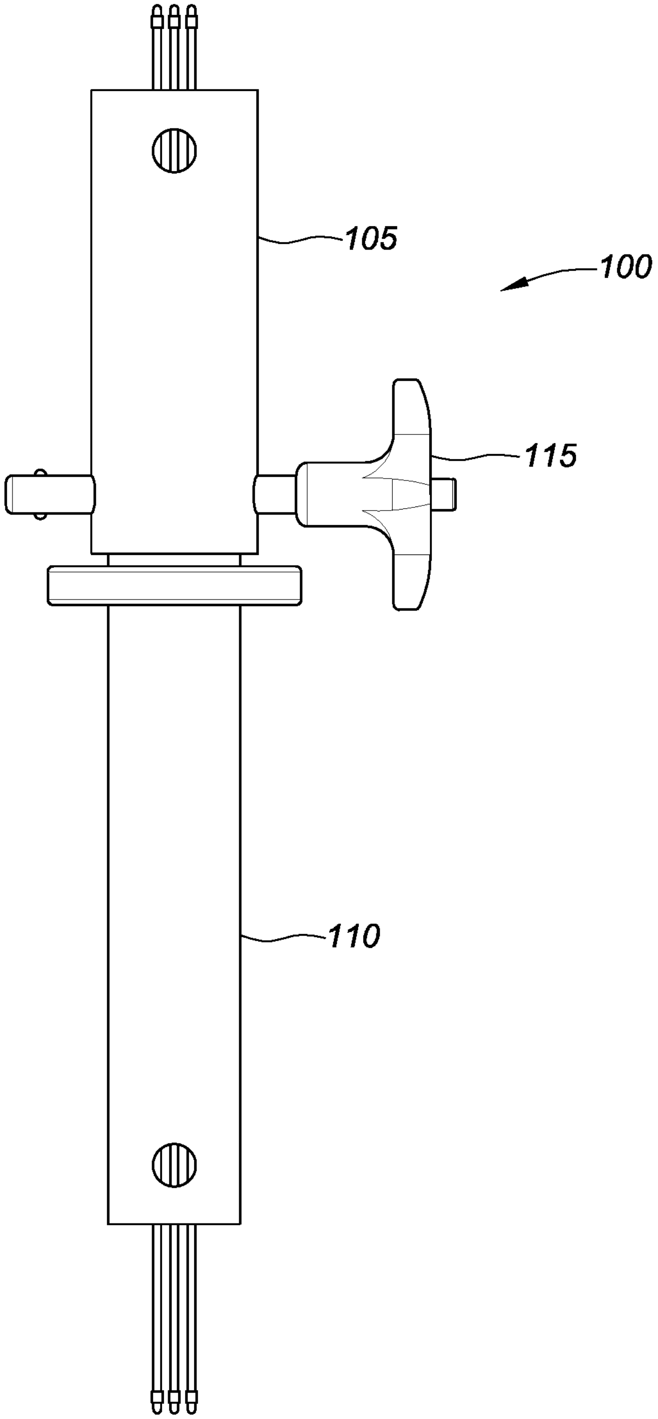
FIG. 1B is a front view of the quick release assembly of FIG. 1A, consistent with various embodiments of the present disclosure.
Figure 1C:
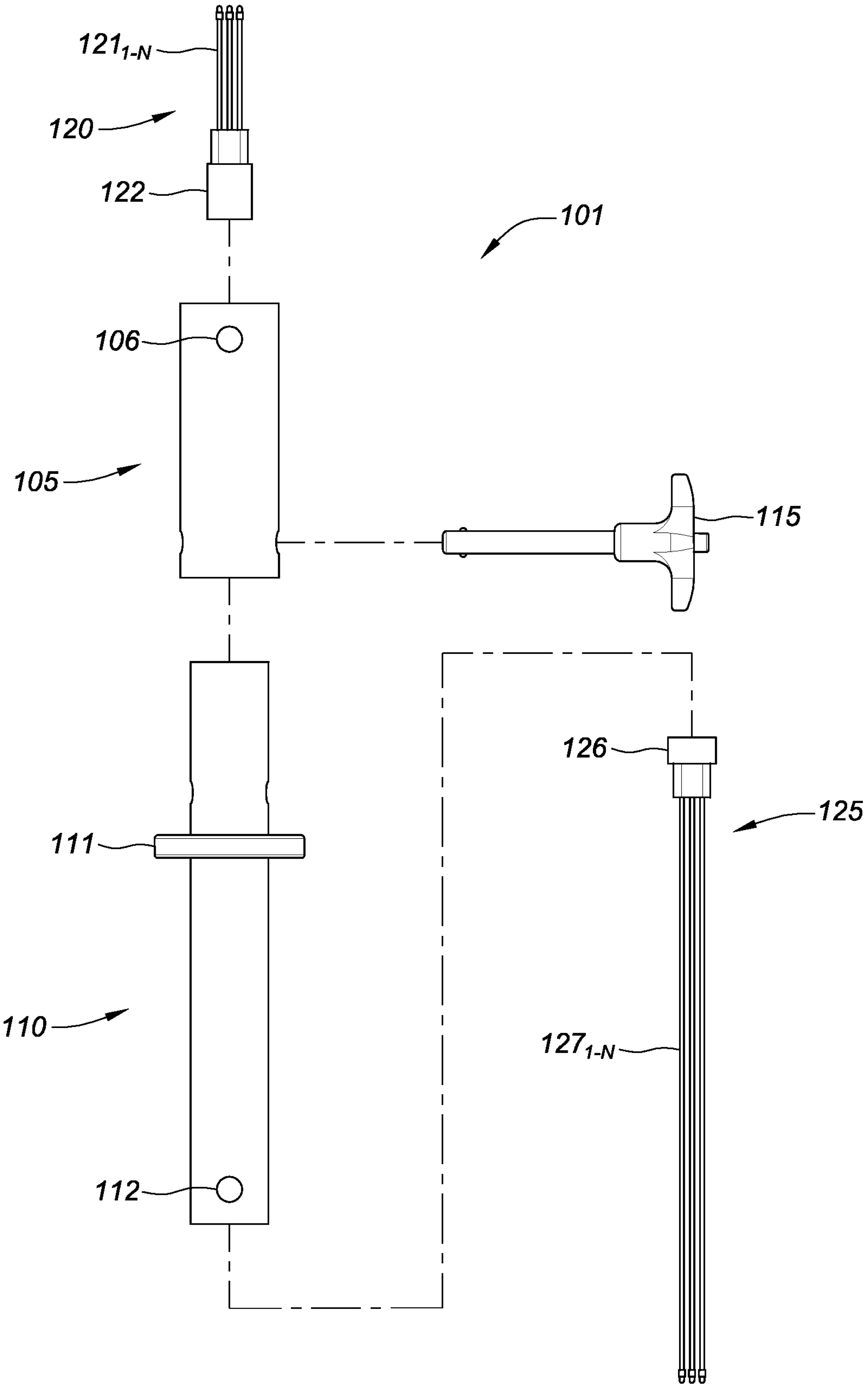
FIG. 1C is a front exploded view of the quick release assembly of FIG. 1A, consistent with various embodiments of the present disclosure.

FIG. 1A is an isometric side view of quick release assembly 100, FIG. 1B is a front view of the quick release assembly of FIG. 1A, and FIG. 1C is a front exploded view of the quick release assembly of FIG. 1A, consistent with various embodiments of the present disclosure. The quick release assembly 100 includes an upper coupling 105 and a lower coupling 110 which are releasably fastened by way of locking pin 115.

In some implementations of the present disclosure, the upper coupling may be fastened to a downrod via mounting point 106, and a light fixture, fan, or combination thereof may be mounted to the lower coupling 110 via mounting point 112. To couple the upper and lower couplings together, a male end of the lower coupling 110 is extended into a female end of the upper coupling 105 until first flange 111 positively contacts a distal end of the upper coupling, and extending the locking pin through co-axially aligned apertures 109 and 113 in the upper and lower coupling, respectively. The pin positively positions the upper and lower couplings relative to one another along a longitudinal axis of the downrod and rotatably about the longitudinal axis.

In some specific embodiments of the present disclosure, mounting points 106 and 112 may be male or female threaded rods, or other fastening means well known by a skilled artisan.

As shown in the exploded view of FIG. 1C, within the upper coupling 105 an upper wiring assembly 120 is fitted including a plurality of electrical conductors $\mathbf{121}_{1\text{-}N}$ extending a length of the upper coupling and an upper electrical connector 122 electrically coupled to each of the electrical conductors. The upper electrical connector 122 is configured to be electrically coupled with a lower electrical connector 126 within the lower coupling 110 when the upper and lower couplings are mated to one another. A lower wiring assembly includes the lower electrical connector 126 which is electrically coupled to a plurality of electrical conductors $127_{1-N}$ which extend through a length of the lower coupling 110. When the quick release assembly 100 is fully assembled the upper and lower wiring assembly electrically couples a fan, light, or combination thereof coupled to the lower coupling 110 to power and/or controller circuitry.

Figure 2A:
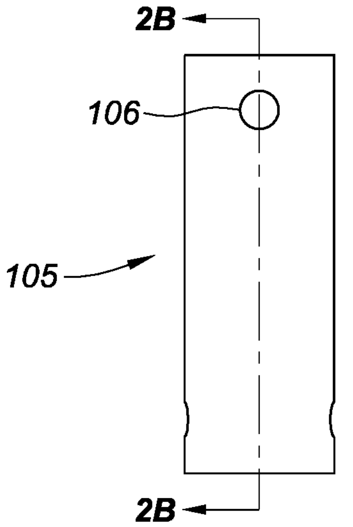
FIG. 2A is a front view of the upper coupling, consistent with various embodiments of the present disclosure.
Figure 2B:
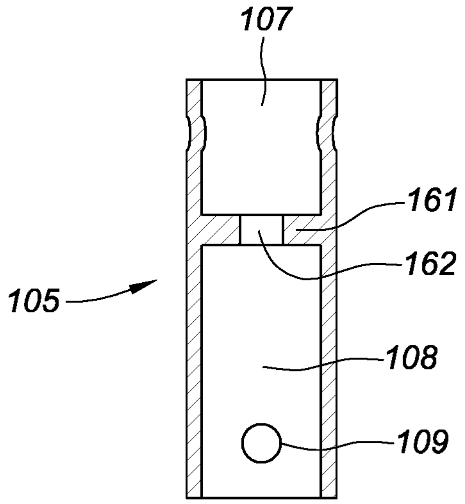
FIG. 2B is a cross-sectional side view of the upper coupling, consistent with various embodiments of the present disclosure.

FIG. 2A is a front view of an upper coupling 105 and FIG. 2B is a cross-sectional side view of the upper coupling, consistent with various embodiments of the present disclosure. The upper coupling includes an upper recess 107 for receiving a downrod and a mounting point 106 for securing the downrod within the upper recess. A lower recess 108 receives an upper portion of the lower coupling 110 and aperture 109 facilitates a locking pin 115 extending through both the upper and lower couplings and fixing them to one another. Upper wiring assembly 120 may be installed within the upper coupling 105 with the upper electrical connector 122 installed within an aperture 162, coupled to a second flange 161 of the upper coupling, or both.

Figure 3A:
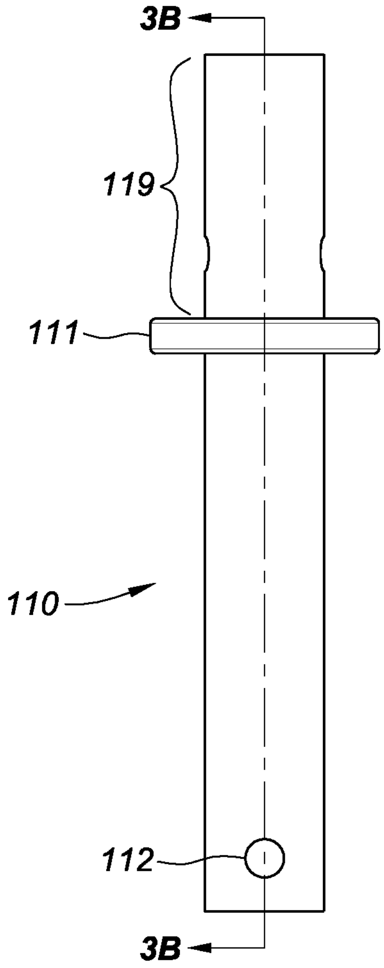
FIG. 3A is a front view of the lower coupling, consistent with various embodiments of the present disclosure.
Figure 3B:
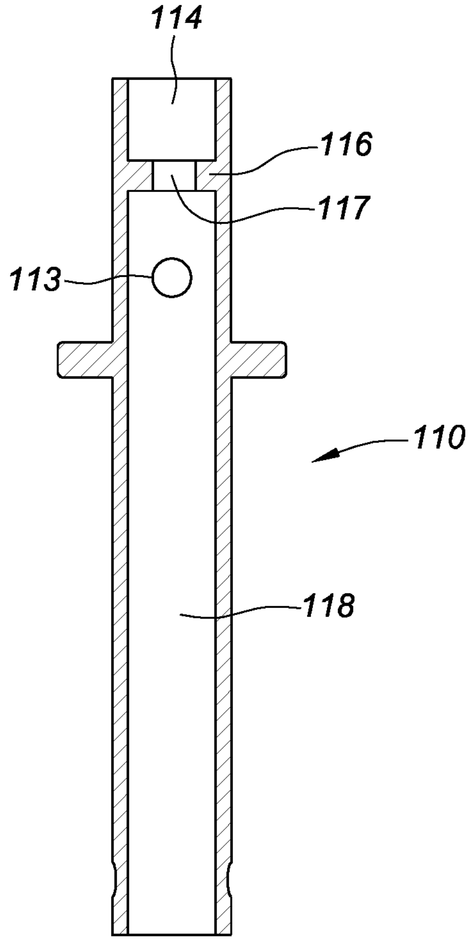
FIG. 3B is a cross-sectional side view of the lower coupling, consistent with various embodiments of the present disclosure.

FIG. 3A is a front view of lower coupling 110 and FIG. 3B is a cross-sectional side view of the lower coupling, consistent with various embodiments of the present disclosure. The lower coupling includes a body 119 that extends into a lower recess 108 of the upper coupling 105 (as shown in FIG. 1B). The body 119 extends into the lower recess 108 until the lower coupling contacts or comes into close proximity of the first flange 111—resulting in the alignment of apertures 109 and 113.

Figure 5A:
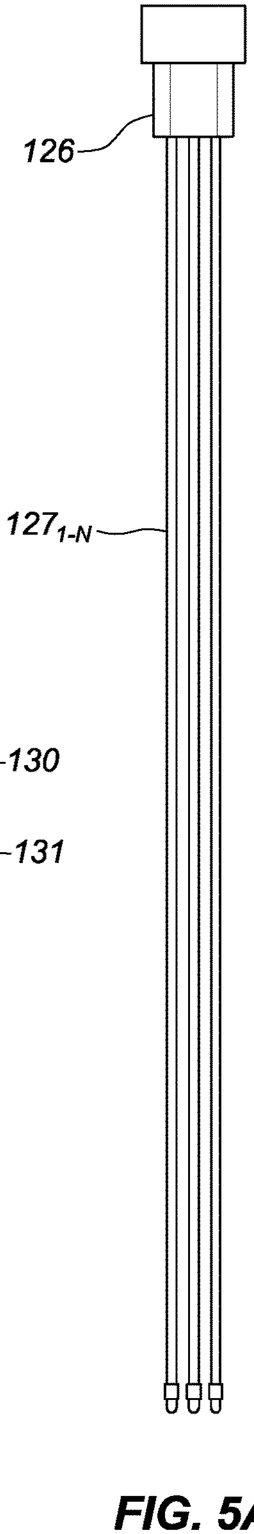
FIG. 5A is a front view of a lower wiring assembly, consistent with various embodiments of the present disclosure.

Lower wiring assembly 120, as discussed in more detail in reference to FIG. 5A, may be installed within the lower coupling 110 with lower electrical connector 126 installed within an aperture 117, coupled to a third flange 116 of the lower coupling, or both. Third flange 116 and aperture 117 divides upper recess 114 from lower recess 118 of the tubular lower coupling 110.

With upper electrical connector 122 positioned within the upper coupling 105 and lower electrical connector 125 positioned within lower coupling 110, mating of the lower and upper couplings results in the corresponding mating of electrical contacts within each of the respective electrical connectors.

A lower recess 118 of the lower coupling 110, in conjunction with mounting point 112, facilitates coupling the lower coupling to/with a fan, light fixture, or combination thereof.

Figure 4A:
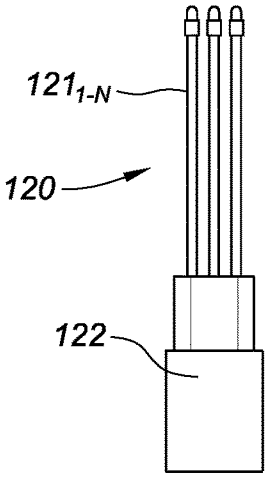
FIG. 4A is a front view of an upper wiring assembly, consistent with various embodiments of the present disclosure.
Figure 4B:
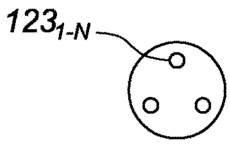
FIG. 4B is a bottom view of the upper wiring assembly of FIG. 4A, consistent with various embodiments of the present disclosure.

FIG. 4A is a front view of an upper wiring assembly 120 and FIG. 4B is a bottom view of the upper wiring assembly of FIG. 4A, consistent with various embodiments of the present disclosure. The upper wiring assembly 120 includes a plurality of electrical conductors $121_{1-N}$ with a length that facilitates a given application. For example, the electrical conductors may extend a length of an upper coupling with enough excess length to facilitate wiring to a power supply within the downrod. The upper wiring assembly 120 further includes an upper electrical connector 122 electrically coupled to each of the electrical conductors. The upper electrical connector 122 is configured to be electrically coupled with a mating connector, such as lower electrical connector 126 within the lower coupling 110 when the upper and lower couplings are mated to one another.

In some embodiments, the upper electrical connector 122 is configured to be positioned within and coupled to an aperture 162 within upper coupling 105. The relative positioning of the aperture 162 facilitates electrical coupling of the upper and lower electrical connectors when the upper and lower couplings are mated to one another. In some specific embodiments, the aperture 162 may include a keyway to facilitate proper rotation positioning of the upper electrical connector therein via a mating feature on an outer diameter of the upper electrical connector.

FIG. 4B illustrates one possible configuration of one or more electrical contacts $123_{1-N}$ within upper electrical connector 122. In the present embodiment, the upper electrical connector includes three electrical contacts $123_{1-3}$—a positive contact, a negative contact, and a ground contact. Accordingly, the upper electrical connector 122 would include three electrical conductors $121_{1-3}$—a positive conductor, a negative conductor, and a ground conductor. Each of the contacts may be circumferentially distributed about a contacting surface of the upper electrical connector 122.

Figure 5B:
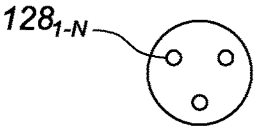
FIG. 5B is a top view of the lower wiring assembly of FIG. 5A, consistent with various embodiments of the present disclosure.

FIG. 5A is a front view of a lower wiring assembly 125 and FIG. 5B is a top view of the lower wiring assembly of FIG. 5A, consistent with various embodiments of the present disclosure. The lower wiring assembly 125 may extend through a length of lower coupling 110 and electrically couple to electrical circuitry of a fan, light, or combination thereof coupled to a distal end of the lower coupling. The lower wiring assembly 125 includes lower electrical connector 126 which is electrically coupled to a plurality of electrical conductors $127_{1-N}$ which extends through a length of the lower coupling 110.

In some embodiments, the lower electrical connector 126 is configured to be positioned within and coupled to an aperture 117 within lower coupling 110. The relative positioning of the aperture 117 facilitates electrical coupling of the upper and lower electrical connectors when the upper and lower couplings are mated to one another. In some specific embodiments, the aperture 117 may include a keyway to facilitate proper rotational positioning of the lower electrical connector therein via a mating feature on an outer diameter of the lower electrical connector.

FIG. 5B illustrates one possible configuration of one or more electrical contacts $128_{1-N}$ within upper electrical connector 126. In the present embodiment, the upper electrical connector includes three electrical contacts $128_{1-3}$ which are similarly positioned upon a contacting surface of the upper electrical connector 126 so as to mate to the electrical contacts 123 of the upper electrical connector 122 when mated. It is to be understood that the electrical contacts 128 of the lower electrical connector 126 may be male contacts and the electrical contacts 123 of the upper electrical contact 122 may be female contacts, or vice versa.

A skilled artisan will readily appreciate that more or less contacts may be implemented in the electrical connectors as necessary to transmit power or to communicate data through the quick release assembly 100. Moreover, various mating patterns of electrical contacts may be implemented on the upper and lower electrical connectors to facilitate the desired number of contacts.

Figure 6A:
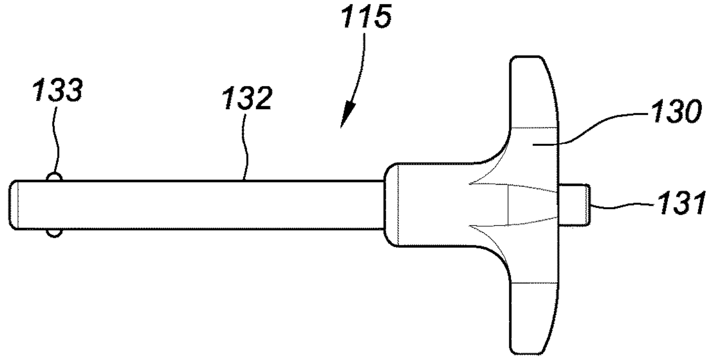
FIG. 6A is a side view of a locking pin, consistent with various embodiments of the present disclosure.
Figure 6B:
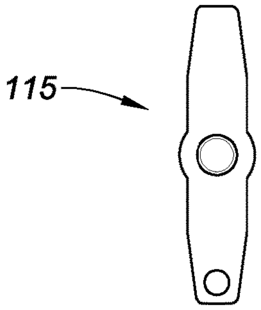
FIG. 6B is a front view of the locking pin of FIG. 6A, consistent with various embodiments of the present disclosure.

FIG. 6A is a side view of a locking pin 115, and FIG. 6B is a front view of the locking pin of FIG. 6A, consistent with various embodiments of the present disclosure. The locking pin 115 includes an handle 130 and a shaft 132. The shaft 132, in use, may be extended through co-axially aligned apertures 109 and 113 in the upper and lower couplings, respectively, to rotationally and axially lock the couplings to one another. When in place, the locking pin may include a locking means 133, such as actuatable D-10 ball bearings, which prevent removal of the locking pin without actuation of a release 131 on the handle 130.

In practice, a user may quickly install a fan coupled to a lower coupling of the quick release assembly by mating the lower coupling with the upper coupling and installing a locking pin through co-axially aligned apertures in both the upper and lower couplings. The mating process both structurally engages the couplings, but also electrically couples connectors within the couplings. To uninstall the fan from a down road, which is coupled to a distal end of the upper coupling, a user actuates a release on a locking pin handle and simultaneously withdraws the locking pin from the upper and lower couplings, after which the lower coupling may be axially withdrawn from the upper coupling.

Although several embodiments have been described above with a certain degree of particularity, those skilled in the art could make numerous alterations to the disclosed embodiments without departing from the spirit of the present disclosure. It is intended that all matter contained in the above description or shown in the accompanying drawings shall be interpreted as illustrative only and not limiting. Changes in detail or structure may be made without departing from the present teachings. The foregoing description and following claims are intended to cover all such modifications and variations.

Various embodiments are described herein of various apparatuses, systems, and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," "an embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A quick release assembly comprising:

an upper coupling is tubular and extends coaxially with a longitudinal axis, the upper coupling includes a lower recess and a first aperture extending through the upper coupling at the lower recess in a direction transverse to the longitudinal axis, wherein the upper coupling further includes:

an upper recess, a second flange that divides the upper and lower recesses and a third aperture that extends through the second flange co-axial with the longitudinal axis, and an upper wiring assembly that extends through the upper recess and has an upper electrical connector that is coupled within the third aperture;

a lower coupling extends coaxially with the longitudinal axis, the lower coupling includes a first flange, a tubular body that extends beyond the first flange, and a second aperture extending through the tubular body of the lower coupling in a direction transverse to the longitudinal axis; and a locking pin configured and arranged to affix the upper and lower couplings by extending through the first and the second apertures when the first and second apertures are aligned.

2. The quick release assembly of claim 1, wherein the lower coupling further includes an upper and lower recess divided by a third flange and a fourth aperture that extends through the third flange co-axial with the longitudinal axis; and further including a lower wiring assembly that extends through the lower recess of the lower coupling and has a lower electrical connector that is coupled within the fourth aperture.

3. The quick release assembly of claim 2, wherein the upper and lower electrical connectors are configured and arranged to communicatively coupled the upper and lower wiring assemblies to one another when the upper and lower couplings are mated to one another via the locking pin.

4. The quick release assembly of claim 1, wherein the first flange of the lower coupling is configured and arranged to prevent the tubular body of the lower coupling from over extending into the lower recess of the upper coupling.

5. The quick release assembly of claim 1, wherein the locking pin is further configured and arranged to prevent both axial and rotational motion of the upper and lower couplings relative to one another with respect to the longitudinal axis.

6. The quick release assembly of claim 1, wherein the locking pin includes a handle and a shaft; the shaft is configured and arranged to be extended through co-axially aligned first and second apertures in the upper and lower couplings, respectively, to rotationally and axially lock the upper and lower couplings relative to one another.

7. The quick release assembly of claim 1, wherein the upper coupling is further configured and arranged to be coupled to a downrod.

8. The quick release assembly of claim 7, wherein the lower coupling is further configured and arranged to be coupled to a fan, wherein the quick release assembly electrically couples the fan to a power supply within the downrod.

9. A system comprising:

a quick release assembly including an upper coupling is tubular and extends coaxially with a longitudinal axis, the upper coupling includes a lower recess, a first aperture extending through the upper coupling at the lower recess in a direction transverse to the longitudinal axis, and upper recess, a second flange that divides the upper and lower recesses and a third aperture that extends through the second flange co-axial with the longitudinal axis, an upper wiring assembly that extends through the upper recess and has an upper electrical connector that is coupled within the third aperture, a lower coupling extends coaxially with the longitudinal axis, the lower coupling includes a first flange, a tubular body that extends beyond the first flange, a second aperture extending through the tubular body of the lower coupling in a direction transverse to the longitudinal axis, and an upper and lower recess divided by a third flange and a fourth aperture that extends through the third flange co-axial with the longitudinal axis, a lower wiring assembly that extends through the lower recess of the lower coupling and has a lower electrical connector that is coupled within the fourth aperture, and a locking pin configured and arranged to affix the upper and lower couplings by extending through the first and the second apertures when the first and second apertures are aligned;

a downrod coupled to the upper coupling and configured and arranged to be coupled to an electrical junction box, the downrod including a plurality of electrical connectors extending through a length of the downrod and electrically coupled to the upper wiring assembly; and a fan coupled to the lower coupling, the lower wiring assembly electrically coupled to the fan.

* * * * *